Patented Aug. 16, 1938

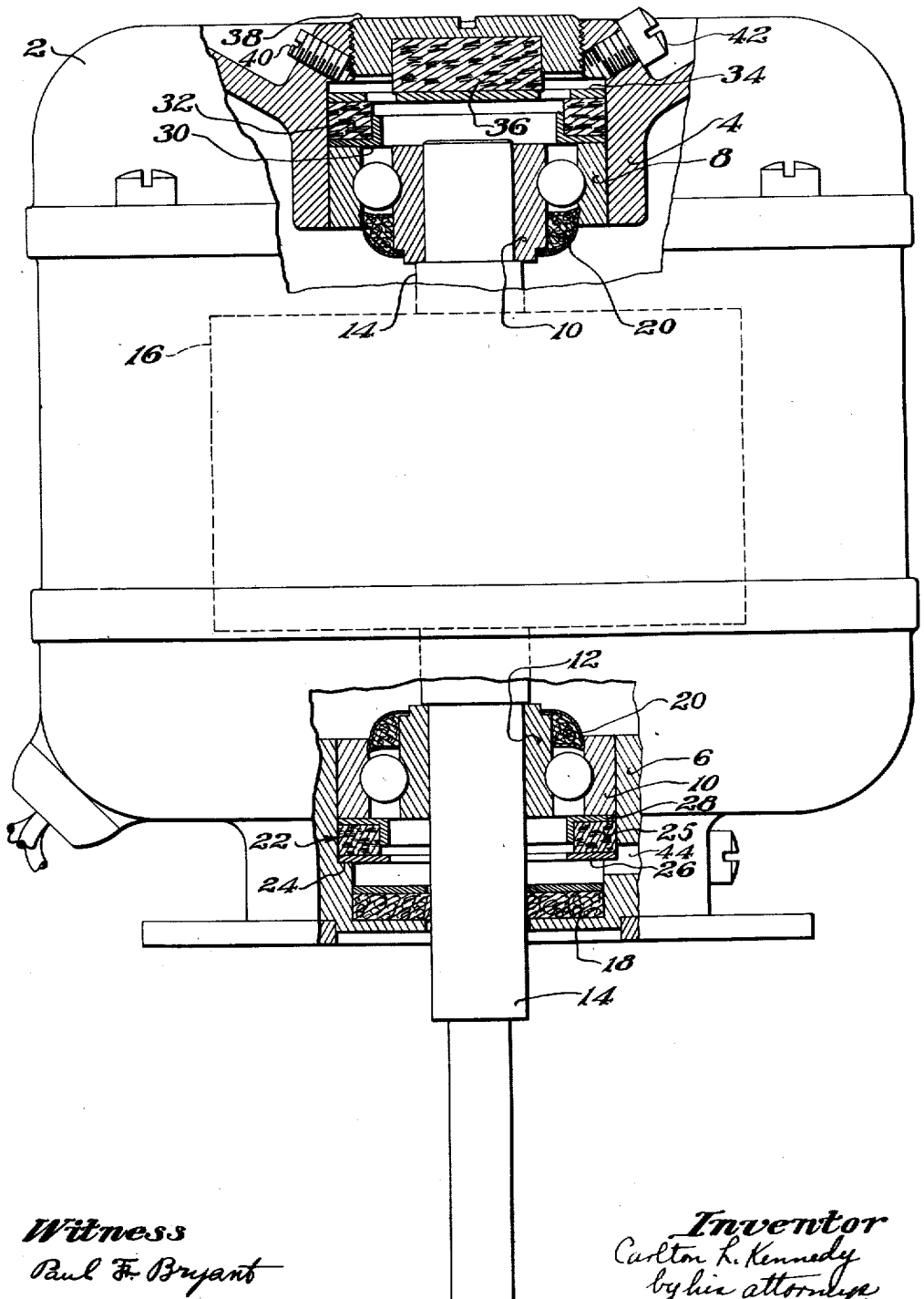

2,126,963

UNITED STATES PATENT OFFICE 2,126,963

BALL BEARING MOTOR

Carlton L. Kennedy, Braintree, Mass., assignor to The Holtzer-Cabot Electric Company, Roxbury, Mass., a corporation of Massachusetts Application November 22, 1935, Serial No. 51,120

4 Claims. (Cl. 308—184)

The present invention relates to motors and more particularly to ball bearing motors.

The principal object of the present invention is to provide a simple and inexpensive ball bearing motor assembly for minimizing the noise which ordinarily arises from the ball bearings. To this end the present invention comprises the motor hereinafter described and particularly defined in the claims.

The accompanying drawing is an elevation, partly in section, of the preferred form of motor.

The illustrated embodiment of the invention comprises a vertical induction motor having a frame 2 provided at its upper and lower ends with bearing sleeves 4 and 6, respectively, to receive the ball bearings. The upper and lower ball bearings have outer ball races 8 and 10, respectively, and inner ball races 10 and 12 which are secured to the vertical shaft 14. The shaft carries a rotor 16. The motor is provided at its lower end with a fibrous sealing ring 18 and sealing rings 20 are attached internally to the outer races to prevent passage of lubricant into the interior of the motor.

The parts, as thus far described, are similar to those used in any ball bearing motor. The motor may be horizontal instead of vertical, but the present invention finds its greatest utility in vertical motors which present the most difficult noise problem, since the rotor floats instead of being supported by the bearings.

The outer ball races 8 and 10 are received in the sleeves 4 and 6 with a sliding fit. The lower ball race is supported on a ring, indicated generally at 22, which is in turn supported on a shoulder 24 of the frame. The ring 22 is composite, comprising a body of resilient sound-insulating material 25, a lower metal plate 26 and an upper metal plate 28. The upper plate is flanged inwardly to engage the resilient material but the plates are held out of contact so that there is no continuous metal surface between the top and bottom of the ring. The resilient material is preferably cork composition because of its resiliency, its resistance to taking a set, and its ability to absorb or prevent the transmission of sound therethrough.

The upper ball race is engaged at its upper end by a composite ring consisting of a metal plate 30 with a central upstanding flange, and a layer of resilient sound-insulating material 32, preferably of cork composition. Overlying the ring 32 is a plate 34 which is preferably perforated to permit the supply of lubricant to the upper ball bearing. The plate is engaged by a resilient plug 36 which is also of cork composition. Adjustable axial pressure is applied to the assembly by means of a screw cap 38 threaded into the end of the frame, the cap being held in adjustable position by a set screw 40.

Lubricant may be supplied to the upper bearing through an inclined passage which is normally closed by a bolt 42, and to the lower bearing by a passage 44. The upper passage leads above the perforated plate 34 and lubricant is permitted to pass through the perforations into the ball races.

In the usual ball bearing motor, particularly one of the vertical type, a considerable amount of noise may be generated by the ball bearings, and since the outer races are supported by metal parts, the noise is transmitted through the frame. At the same time, the noise increases as the motor wears and the bearings become somewhat looser. According to the present invention, however, the whole bearing assembly is resiliently supported between the rings 22 and 32, and direct axial transmission of noise from metal to metal is avoided. Furthermore, looseness occasioned by slight wear is compensated by the natural resiliency of the rings. It will be understood that in setting up the motor, both rings, as well as the plug 36, are maintained under a compression sufficient to avoid undesirable noise. Eventually, if the motor becomes noisy, the noise can be diminished by taking up slightly on the cap 38.

The invention having been thus described, what is claimed is:

1. A motor having, in combination, a vertical frame, a vertical shaft, ball bearings at top and bottom of the frame, each having an outer race slidingly received in the frame, a ring supported by the frame and supporting the lower race, said ring comprising a layer of resilient sound-insulating material, a ring of resilient sound-insulating material engaging the end of the upper race, a plate above the ring, a plug of resilient material above the plate, and a screw cap to apply adjustable axial pressure to the plug.

2. A motor having, in combination, a frame, a rotor, a shaft, ball bearings at ends of the frame and having inner and outer ball races, rings composed of sound-insulating material engaging the outside ends of the outer ball races, one of said rings being held by the frame, and means for applying adjustable pressure to the other of said rings, said means including a plug of sound-insulating material.

3. A motor having, in combination, a frame, a rotor, a shaft, ball bearings at opposite ends of the rotor, each including an inner ball race directly secured to the shaft and an outer ball race slidingly received in the frame and having metal-to-metal contact therewith, rings composed of resilient sound-insulating material engaging the outside ends of the outer ball races, the frame having means for positioning one of said rings, and adjustable means for applying endwise pressure to the other of said rings.

4. A motor having, in combination, a frame, a rotor, a shaft, ball bearings at opposite ends of the rotor, each including an inner ball race directly secured to the shaft and an outer ball race slidingly received in the frame and having metal-to-metal contact therewith, rings composed of resilient sound-insulating material engaging the outside ends of the outer ball races, the frame having means for positioning one of said rings, and an adjustable threaded member for applying endwise pressure to the outer of said rings.

CARLTON L. KENNEDY.

CERTIFICATE OF CORRECTION.

Patent No. 2,126,963. August 16, 1938.

CARLTON L. KENNEDY.

It is hereby certified that error appears in the printed specification of the above numbered patent requiring correction as follows: Page 2, second column, line 10, for the word "outer" read other; and that the said Letters Patent should be read with this correction therein that the same may conform to the record of the case in the Patent Office.

Signed and sealed this 20th day of September, A. D. 1938.

Henry Van Arsdale (Seal) Acting Commissioner of Patents.

rotor, a shaft, ball bearings at opposite ends of the rotor, each including an inner ball race directly secured to the shaft and an outer ball race slidingly received in the frame and having metal-to-metal contact therewith, rings composed of resilient sound-insulating material engaging the outside ends of the outer ball races, the frame having means for positioning one of said rings, and adjustable means for applying endwise pressure to the other of said rings.

4. A motor having, in combination, a frame, a rotor, a shaft, ball bearings at opposite ends of the rotor, each including an inner ball race directly secured to the shaft and an outer ball race slidingly received in the frame and having metal-to-metal contact therewith, rings composed of resilient sound-insulating material engaging the outside ends of the outer ball races, the frame having means for positioning one of said rings, and an adjustable threaded member for applying endwise pressure to the outer of said rings.

CARLTON L. KENNEDY.

CERTIFICATE OF CORRECTION.

Patent No. 2,126,963.                              August 16, 1938.

CARLTON L. KENNEDY.

It is hereby certified that error appears in the printed specification of the above numbered patent requiring correction as follows: Page 2, second column, line 10, for the word "outer" read other; and that the said Letters Patent should be read with this correction therein that the same may conform to the record of the case in the Patent Office.

Signed and sealed this 20th day of September, A. D. 1938.

Henry Van Arsdale (Seal)                                Acting Commissioner of Patents.